United States Patent
Rizzi

(10) Patent No.: US 10,655,921 B2
(45) Date of Patent: May 19, 2020

(54) TUBE HEAT EXCHANGE UNIT FOR INTERNALS OF HEAT EXCHANGERS REACTORS

(71) Applicant: Casale SA, Lugano (CH)

(72) Inventor: Enrico Rizzi, Casnate con Bernate (IT)

(73) Assignee: Casale SA, Lugano (CH)

( * ) Notice: Subject to any disclaimer, the term of this patent is extended or adjusted under 35 U.S.C. 154(b) by 0 days.

(21) Appl. No.: 16/022,303

(22) Filed: Jun. 28, 2018

(65) Prior Publication Data

US 2018/0306526 A1 Oct. 25, 2018

Related U.S. Application Data

(63) Continuation of application No. 15/034,426, filed as application No. PCT/EP2014/077906 on Dec. 16, 2014.

(30) Foreign Application Priority Data

Dec. 18, 2013 (EP) .................................... 13197981

(51) Int. Cl.
*B01J 8/06* (2006.01)
*F28D 7/06* (2006.01)
(Continued)

(52) U.S. Cl.
CPC .......... *F28F 9/0131* (2013.01); *B01J 8/0403* (2013.01); *B01J 8/0496* (2013.01); *B01J 8/067* (2013.01);
(Continued)

(58) Field of Classification Search
CPC ........ F28F 9/0131; F28F 9/013; B01J 8/0403; B01J 8/0496; B01J 8/067; B01J 31/0284;
(Continued)

(56) References Cited

U.S. PATENT DOCUMENTS

| 1,962,362 A | 2/1933 | Reed |
| 2,278,778 A | 4/1942 | Grossmann et al. |

(Continued)

FOREIGN PATENT DOCUMENTS

| DE | 1039040 B | 9/1958 |
| EP | 0376000 A1 | 7/1990 |

(Continued)

OTHER PUBLICATIONS

International Search Report issued in connection with PCT/EP2014/077906.

(Continued)

*Primary Examiner* — Huy Tram Nguyen
(74) *Attorney, Agent, or Firm* — Akerman LLP

(57) ABSTRACT

Tube-bundle heat exchange unit (1) for internals of heat exchangers or reactors, comprising: at least one tube bundle (2); a plurality of baffles (3) associated with said tube bundle and defining through-openings according to a predefined arrangement, each opening being passed through by one of more tubes of the tube bundle, and a shell (6) which surrounds said tube bundle and said baffles, wherein the assembly of the tube bundle and the shell can be disassembled and the shell is structurally collaborating with the tube bundle through said baffles.

19 Claims, 11 Drawing Sheets

(51) Int. Cl.

| | | |
|---|---|---|
| *F28D 7/16* | (2006.01) | |
| *F28F 9/013* | (2006.01) | |
| *F01K 5/02* | (2006.01) | |
| *B01J 31/02* | (2006.01) | |
| *B01J 8/04* | (2006.01) | |
| *F28D 21/00* | (2006.01) | |
| *F28F 9/22* | (2006.01) | |

(52) U.S. Cl.
CPC ............ *B01J 31/0284* (2013.01); *F01K 5/02* (2013.01); *F28D 7/06* (2013.01); *F28D 7/16* (2013.01); *F28F 9/013* (2013.01); *B01J 2208/00194* (2013.01); *B01J 2208/00221* (2013.01); *B01J 2208/065* (2013.01); *B01J 2231/645* (2013.01); *F28D 2021/0022* (2013.01); *F28F 2009/226* (2013.01); *F28F 2265/30* (2013.01); *F28F 2280/02* (2013.01)

(58) Field of Classification Search
CPC ..... F01K 5/02; F28D 7/06; F28D 7/16; F22B 37/205
USPC ......................................................... 422/201
See application file for complete search history.

(56) References Cited

U.S. PATENT DOCUMENTS

| | | |
|---|---|---|
| 3,084,742 A | 4/1963 | Davies et al. |
| 3,351,131 A | 11/1967 | Berthold |
| 3,400,758 A | 9/1968 | Lee |
| 3,739,443 A | 6/1973 | Friedman |
| 3,907,031 A | 9/1975 | Tegethoff |
| 4,213,499 A | 7/1980 | Straffi |
| 4,429,739 A | 2/1984 | Gentry et al. |
| 4,503,903 A | 3/1985 | Kramer |
| 4,585,053 A | 4/1986 | Kaufman et al. |
| 4,689,969 A | 9/1987 | Van Steenburgh, Jr. |
| 5,058,664 A | 10/1991 | Gentry |
| 5,382,271 A | 1/1995 | Ng et al. |
| 5,492,170 A | 2/1996 | Gil |
| 5,570,739 A | 11/1996 | Krawchuk et al. |
| 5,642,778 A | 7/1997 | Gentry |
| 6,536,513 B1 | 3/2003 | Font-Freide et al. |
| 6,994,833 B1 | 2/2006 | Nishimura et al. |
| 8,673,230 B2 | 3/2014 | Rizzi et al. |
| 2005/0161204 A1 | 7/2005 | Johnston et al. |
| 2006/0076126 A1 | 4/2006 | Fandry |
| 2006/0102321 A1 | 5/2006 | Shincho et al. |
| 2009/0301699 A1 | 12/2009 | Karrs et al. |
| 2011/0189578 A1 | 8/2011 | Crumm et al. |

FOREIGN PATENT DOCUMENTS

| | | |
|---|---|---|
| EP | 1434022 A2 | 6/2004 |
| FR | 2111834 A1 | 6/1972 |
| FR | 2461221 A1 | 1/1981 |

OTHER PUBLICATIONS

European Search Report issued in connection with EP 13197981.
International Preliminary Report on Patentability issued in connection with PCT/EP2014/077906.

TUBE HEAT EXCHANGE UNIT FOR INTERNALS OF HEAT EXCHANGERS REACTORS

CROSS-REFERENCE TO RELATED APPLICATIONS

This application is a continuation of U.S. patent application Ser. No. 15/034,426, filed May 4, 2016, which is a national phase of PCT/EP2014/077906, filed Dec. 16, 2014, which claims priority to European Patent Application No. 13197981.7 filed Dec. 18, 2013, the disclosures of which are hereby incorporated by reference in their entirety.

FIELD OF APPLICATION

The invention relates to tube heat exchange units for internals of heat exchangers or reactors, in particular reactors for the chemical or petrochemical industry. A preferred application of the invention consists in gas-to-gas exchangers for internals of catalytic reactors, such as intercooled multi-bed reactors. The invention also applies in general to tubular apparatus, such as heat exchangers or reactors, comprising an outer shell suitable for withstanding a predefined operating pressure and a second inner shell which surrounds a tube bundle.

PRIOR ART

The need to install tube-bundle heat exchange units inside chemical reactors, heat exchangers or other apparatus is known. Notable examples are multi-bed reactors containing one or more intermediate gas-to-gas heat exchangers between the beds, such as the reactor described in EP 0 376 000.

Heat exchanger units designed for the internals of reactors or other apparatus have their own shell, which is generally defined as inner shell or low pressure shell. The reactor or apparatus comprises another shell, namely an outer shell, which is suitably designed to withstand the operating pressure and which is defined as high pressure shell.

The outer shell, or high pressure shell, should typically withstand a pressure operating from the inside to the outside, which is generally several tens of bars or in some cases more than 100 bar, and is designed accordingly. Instead, the inner shell, or low pressure shell, is typically subjected to a radial pressure operating from the outside to the inside, namely directed toward the axis. In fact, in most applications, including the known "fluxed" ammonia reactors, the pressure inside and outside the shell is generated by the fluid itself, which passes through a first passage outside the shell, and then goes inside. As a consequence, the pressure inside the shell is lower than the pressure acting on the outer surface, owing to the pressure losses of the fluid stream. In other words, the shell may be deemed to be a cylindrical body which is subjected to a pressure from the outside, said pressure being equal to the pressure loss (delta-p) of the fluid.

As it is known, the stress imparted on a cylindrical body being subjected to an outer pressure may induce instability and the breakdown of the cylindrical body even with relatively low pressures. For this reason, in any case the wall of the inner shell must have such a thickness that increases its weight and cost.

Another common feature of the prior art is the presence of baffles which support the tubes, thus preventing vibrations. A known way of making said baffles is the so called rod baffle configuration, which is described, among other documents, in U.S. Pat. Nos. 5,058,664 and 5,642,778. Said configuration provides for a framework of longitudinal rods for supporting the baffles.

The known technique for the construction of heat exchanger units for the internals is substantially as follows: an assembly formed by the tube bundle, the baffles and the corresponding framework is realized and introduced inside a cylindrical shell. The tube bundle with its respective baffles and the shell are structurally independent, which means that the shell is designed for autonomously withstanding the difference in the operating pressure (delta-p) between the interior and the exterior. The shell realized according with the above technique is defined as self-supporting.

This technique has a number of problems and drawbacks, which have not been overcome so far.

A first problem is given by the bypass of the tube bundle on behalf of the fluid crossing the shell side. This effect is due to the presence of an area between the shell and the tube bundle which is not occupied by the tubes (bypass areas) and cannot be eliminated. The rings of the baffles contribute to create said bypass areas: in fact the thickness of said rings defines an area adjacent to the shell which cannot be occupied by the tubes.

The bypass areas are greater when the diameter of the tubes is relatively large compared to the diameter of the shell, and this is frequently the case in the field of heat exchangers for the interiors of reactors, whose shell has a small diameter. In some cases, the bypass area may be more than 20% to 30% of the available flow cross-section. In some embodiments, the tubes are distributed in a circular ring, between an internal tube and an outer shell, and consequently there exist bypass areas both on the inner periphery and on the outer periphery.

When heat exchangers are of the extractable tube bundle-type, the amount of play between the baffle outer periphery and the shell inner diameter, ensuring the tube bundle extraction, adds to the bypass area.

The framework supporting the baffles is a heavy and costly structure, and results in the loss of useful volume for the tubes. Moreover, the tube assembly is difficult, as well known. Tubes should pass through the openings of the baffles with a quite precise fit, otherwise the baffles would be unable to prevent vibrations of the tubes. Applicable norms stipulate a very small amount of play (practically zero play) between tubes and baffles and often the tubes must be forced inside the tube bundle, resulting in a long assembly time and the risk of damage.

Alternative embodiments provide for baffles which are welded or fixed inside the shell. In these embodiments, however, the tube bundle is not extractable and not demountable, resulting in a significant drawback. Non-demountable tube bundle makes maintenance operation more complex. Moreover, owing to presence of welded baffles, tubes are necessarily inserted after the assembly of the baffles with the shell, involving great difficulties. Hence, said alternative embodiments have not gained great success.

In substance, the prior art teaches that an extractable tube bundle needs a structurally independent shell and this technique have been considered so far the only applicable.

Further need, which has not been completely accomplished in the prior art, is the following. In some applications, it is desirable to split the shell side in a number of partitions, or to provide the shell side fluid with a predetermined inlet and/or outlet position. For example, in multi-bed reactors, the gas exiting the shell side must be generally fed to a subsequent catalytic bed, and the heat exchanger unit should be preferably designed so as to house the gas outlet at the feeding point of the bed, otherwise a dedicated tube or manifold is required in order to re-direct the gas, resulting in a number of drawbacks such as greater complication, greater dimensions, pressure losses.

There is also the problem connected with the reduction of the dimensions. For example, as regards catalytic reactors, it is known that the space inside the reactor is of great importance because it essentially determines the volume of catalyst, i.e. the useful volume which contributes to the conversion. This is true in particular in the case of revamping operations aimed at increasing the production, where attempts are made to recover useful volume inside a pre-existing reactor. The volume of the exchangers situated between subsequent beds is not available to the catalyst and consequently there is a great incentive to reduce the dimensions of the exchangers. Another important factor is the exchange efficiency which in turn influences the dimensions.

SUMMARY OF THE INVENTION

The invention aims to solve the aforementioned problems and provide an exchanger for internals of high-pressure apparatus which allows, compared to the prior art: greater efficiency; more compact design for the same performance (exchange area, pressure losses); greater flexibility of configurations with respect to the location of the inlet and outlet for the gas on the shell side; easy execution and disassembly for maintenance operations; lower costs.

The objects are thus achieved with a heat exchange unit according to the attached claim 1.

The heat exchange unit is characterized in that the assembly formed by the tube bundle and the shell is demountable, that is it can be disassembled, and in that the shell cooperates structurally with the tube bundle through said baffles. As a consequence, a possible stress on the shell is partially withstood by the tube bundle itself. Said stress, for example, is a pressure operating on the shell from the outside.

The expression "assembly which can be disassembled" denotes that the tube bundle may be separated from the shell without the need of extracting the tubes. This can be realized preferably by means of a demountable connection between the shell and the baffles of the tube bundle. According to the invention, a demountable assembly may also include a number of weld points, provided that said weld points are localized and made so as to be accessible in order to allow an easy grinding without damaging the parts, during the disassembling process.

In a preferred embodiment, the baffles of the tube bundle comprise peripheral edge rings, and the structural collaboration between the shell and the tube bundle is given by the shell resting on said rings. As a consequence, a stress acting on the shell, such as an outer pressure or a difference between outer and inner pressure, is at least partially transferred to the rings, which act as stiffening elements of the shell itself.

The connection between the baffles and the tubes, which is without play or with a very small amount of play, gives a structural unit between the shell, the baffles and the tubes, making possible a construction with thinner rings of the baffles and thinner shell, for the same mechanical resistance, with respect to the prior art. This also ensures greater heat exchange efficiency.

Typically, the outer surface of the shell is subjected to a pressure which is higher than the pressure operating on the inner surface, hence the stress acting on the shell is substantially the same as the stress acting on a shell which is subjected to a pressure from the outside being equal to the difference of pressure between the outside and the inside.

The contact area between the shell and the rings of the baffles may extend along the entire perimeter of the rings, or along a part of said perimeter. Preferably, the shell rests on the rings of said baffles of the tube bundle for at least 50% of their perimeter. Preferably, the rings have a circular shape and its perimeter is represented by the circumference.

According to the invention, the shell may be defined as non self-supporting. The thickness of the shell is smaller than a thickness required by the designed stress which may be calculated following the standard norms (i.e. ASME), and shell resistance is given by the structural collaboration with the tube bundle. This feature will be shortly indicated as "small thickness" hereafter.

In certain embodiments, the baffles are realized with bars being directly fixed to the shell, and in this case said bars act substantially as struts of the shell.

The shell may be formed by one or more circumferential sectors surrounding the tube bundle, the rims of said one or more circumferential sectors being joined along one or more longitudinal joints. More in detail, the one or more sectors of the shell may be represented by plane metal sheets which are bended during the assembling, so as to surround the bundle. This is made possible by the small thickness of the shell.

The above represents a substantial difference with respect to the prior art. In the prior art, a tube bundle which can be extracted from a shell is constructed so as the baffles act as supporting elements keeping the tubes in position, but they do not structurally collaborate with the shell, and the latter is designed as self-supporting with large thickness.

The advantages of the invention are essentially as follows: the shell may be realized with a small thickness, hence lighter and less costly, since it is not required to be self-supporting thanks to the structural collaboration with the tube bundle inside; the rings of the baffles are also thin, thus reducing the amount of play between the shell and the tube bundle and reducing, as a consequence, the undesired bypass. The baffles are supported and guided axially by the shell and do not require the complex and costly support framework of the prior art. The absence of the framework increases the space available for the tubes and, as a consequence, the heat exchange efficiency increases, for the same dimensions.

The demountable design makes the access to the tube bundle for cleaning or inspections easier. Another significant advantage is compactness. In catalytic reactors this advantage is particularly appreciated because it allows recovery of useful catalyst volume.

The present invention may reduce the number of baffles required, for the same performance. In the prior art, it is taught that some additional baffles have the sole function of reducing the bypass by deviating the flow from the walls of the shell toward the centre of the tube bundle. However, the additional baffles introduce further pressure losses in the shell side. The invention substantially removes the bypass and allows installation only of the baffles required for avoiding the tube vibrations, with consequent reduction of costs and pressure losses.

Another important advantage consists in the possibility of easily providing both transverse and longitudinal partitions on the shell side. Transverse partitions on the shell side may be obtained, for example, using blind baffles, while shell joints allow to easily obtain longitudinal partitions with almost perfect sealing, as required in the case of U-shaped tubes, avoiding the more costly sealing means which are instead indispensable in the prior art.

Another remarkable advantage of the invention is given by the fact that an innovative assembly technique is allowed, as defined by the claims. This assembly technique essentially envisages:

providing the tube bundle comprising the tubes and respective baffles, the baffles being free-moving at least in the axial direction relative to said tubes;

assembling the shell by overlapping one or more longitudinal shell portions on the tube bundle, wherein the shell, once positioned, rests on the baffles of the tube bundle and, in addition, the baffles are axially retained by the shell in their respective operating position relative to the tube bundle.

The assembly method, according to the invention, has the significant advantage of simplifying the insertion of the tubes thanks to the through-openings provided by the baffles. Before assembling the shell, the baffles are not constrained axially with respect to the tubes and have a certain freedom of movement, despite the precise tolerances between tubes and openings in the baffles. This facilitates significantly the insertion of tubes. For example the tubes of a straight bundle must be centred only on the two tube plates. The baffles are then put in position one by one, for example by means of a template, and locked in the desired configuration upon assembly of the shell. This reduces significantly the assembly time and difficulties and therefore the cost.

Other aspects and applications of the invention, as well as further advantages, are described below and represent the object of dependent claims.

In some embodiments the shell has a non-circular cross-section. Fixing of the shell to the baffles of the tube bundle, in fact, facilitates the construction of non-cylindrical shells. For example the shell may have: a cross-section with the faun of a regular polygon; a cross-section with the form of an irregular polygon; a cross-section comprising one or more straight sides and one or more curvilinear sides, preferably circle arcs. According to preferred embodiments, a shell has a polygonal cross-section with 6, 8 or 12 sides, which is regular or irregular. Other variants of the invention comprise: a shell with a stepped cross-section; a shell with a polygonal cross-section closely matching a circular cross-section. Said stepped cross-section is formed, for example, by sides arranged adjacent at 90 degrees and in succession which approximate a circle.

An advantage of these embodiments is the further reduction of the bypass areas, owing to the fact that a non-circular cross-section remains close to the edges of the baffles and close to the peripheral tubes of the bundle.

The shell may comprise a plurality of longitudinal sections, preferably having a length substantially equal or multiple of the distance between two consecutive baffles of the tube bundle. Said distance is also called the pitch of the baffles. These embodiments may be defined as "segmental shell". A shell formed as a single and removable part may be regarded as being a single segment.

In some embodiments of the invention, the baffles are formed by respective assemblies made of straight bars fastened directly to the shell. The baffles thus do not have a peripheral edge or frame.

Generally, an embodiment comprising baffles without frame has a shell provided with seats for receiving the bars which form the baffles. Said seats may be for example circular holes or slots of a suitable shape, for example a rectangular shape.

Another measure for facilitating assembly in an embodiment comprising baffles without frame is the following. The shell is formed by longitudinal sections and the seats for receiving the bars of the baffles may be: composed of two half-cavities formed in the edge of adjacent sections of the shell, or formed entirely in the edge of one of the sections.

In the second case, for example, the sections have a top edge having suitably shaped incisions formed therein and a smooth bottom edge. When the shell sections are stacked one above the other, the seats for housing the bars of the baffles are defined along the edge between two sections.

Preferably, the connection between said baffles and said shell is substantially fluid-tight. The term "substantially fluid-tight" is understood as meaning that the connection between baffles and shell can be sealed, or can allow a bypass which however is negligible compared to the involved total throughput.

In some embodiments, at least one of the baffles of the tube bundle is blind, i.e. forms a sealed barrier which prevents the gas passage in the shell side. A blind baffle is sealed with respect to the outside of the tubes which form the bundle.

The presence of one or more sealed blind baffles, which may be in combination with one or more longitudinal baffles, and/or in combination with a shell formed by longitudinal sections, allows the formation of two or more fluid passages in the shell side, with a great degree of freedom and flexibility. For example the shell side fluid inlet and outlet points may be determined by the designer with a greater degree of freedom than in the prior art.

The invention also relates to an apparatus, in particular a reactor for the chemical or petrochemical industry, or a heat exchanger, comprising an outer shell able to withstand a predefined operating pressure and comprising a heat exchange unit according to the accompanying claims.

A preferred application consists in intercooled multi-bed catalytic reactors. In this case, the heat exchangers between a catalytic bed and the following bed, or at the outlet of a catalytic bed, are advantageously realized according to the invention.

Intercooled multi-bed reactors are known in the prior art. Typically said reactors comprise annular catalytic beds and one or more tubular heat exchangers; each of said exchangers is inserted coaxially in the centre of a bed; the effluent gas from a bed passes through the shell side of the exchanger before entering the next bed. Inside the tubes a cooling fluid which may be for example water, steam or fresh gas (re-agents) circulates and is thus preheated.

The invention also applies to the modernization of existing reactors. A reactor of the intercooled multi-bed type, for example, may be modernized by replacing one or more existing inter-bed heat exchangers with heat exchangers according to the invention, i.e. comprising a tube bundle, a plurality of tube bundle baffles and a shell structurally integral with the baffles.

This application is particularly interesting since there exists a wide range of intercooled adiabatic bed reactors, in particular in the field of ammonia and methanol production, and there is a pressing need to modernize these reactors by increasing their capacity.

In a reactor with annular beds and intermediate exchangers in the centre of the beds, the replacement of a conventional exchanger with an exchanger according to the present invention allows a reduction in the diameter of the inner collector of the first and second beds, recovering the outer surface, which in the case of a circular shell generates the bypass effect, as outflow cross-section of the gas. Owing to the greater exchange efficiency it is also possible to reduce the number of tubes and obtain an even more compact exchanger. In some embodiments a single tube bundle may replace two or more conventional exchangers, in particular owing to the segmented shell. In this way a more advantageous design is obtained, for example with a reduction in the number of tube plates.

In partially open reactors (also called "bottle reactors"), the reduction in the diameter of said inner collector may result in further constructional simplification. For example, the inside of these reactors is accessible only via an opening (manhole) with a relatively small diameter, and the inner collector is formed by several parts which must be introduced one by one inside the manhole and then welded inside the reactor. This operation is long and complex due to the need to perform welding inside the reactor itself. A smaller inner collector, which is made possible by the invention, may be introduced through the manhole as one piece, with significant simplification and a reduction in costs.

The advantages will emerge even more clearly with the aid of the following detailed description relating to a number of preferred embodiments.

DETAILED DESCRIPTION

Figure 1:
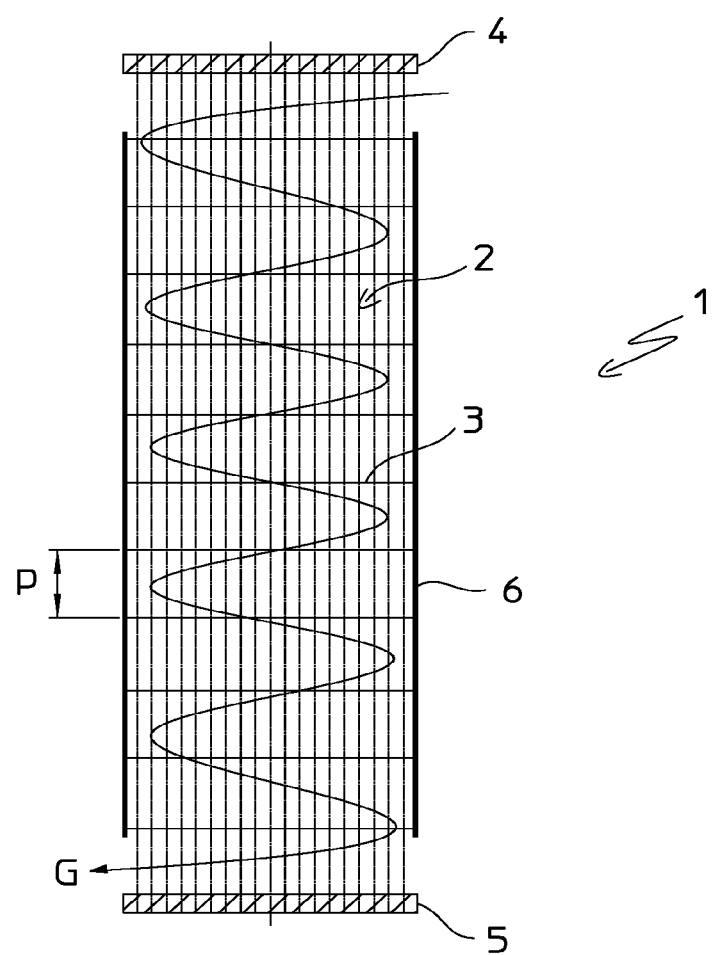
FIG. 1 is a diagram of a tube heat exchange unit according to a first embodiment of the invention.

FIG. 1 shows a heat exchange unit 1 for internals of reactors, comprising a tube bundle 2 (only the tube axes are indicated for the sake of simplicity) and a series of baffles 3. The example shows straight tubes between two tube plates 4 and 5, but in other embodiments the tube bundle 2 may be for example U-shaped.

The baffles 3 prevent vibration of tubes, promote heat exchange and define passing-through openings, each passed through by one or more tubes, for example a row of tubes. Adjacent baffles may support tubes in different directions, in accordance with the rod baffle construction technique or other known techniques.

The exchanger 1 comprises a shell 6 which surrounds the tube bundle 2 and which, according to the invention, is structurally integral with the tube bundle 2 through the baffles 3 and can be disassembled. The arrow G of FIG. 1 denotes a fluid passing through the shell side of the exchanger 2, entering near the plate 4 and exiting near the plate 5.

The baffles 3 are spaced from each other by a pitch p, which is preferably constant.

The flow G exchanges heat with another flow passing inside the tubes of the bundle 2. In some applications, the exchanger 1 is a gas-to-gas exchanger; the gas G contains reagents and reaction products and is the effluent of a catalytic bed; the flow inside the tubes for example consists of reagents which are preheated. In other applications the fluid inside the tubes may consist of water, steam, etc.

Figure 2:
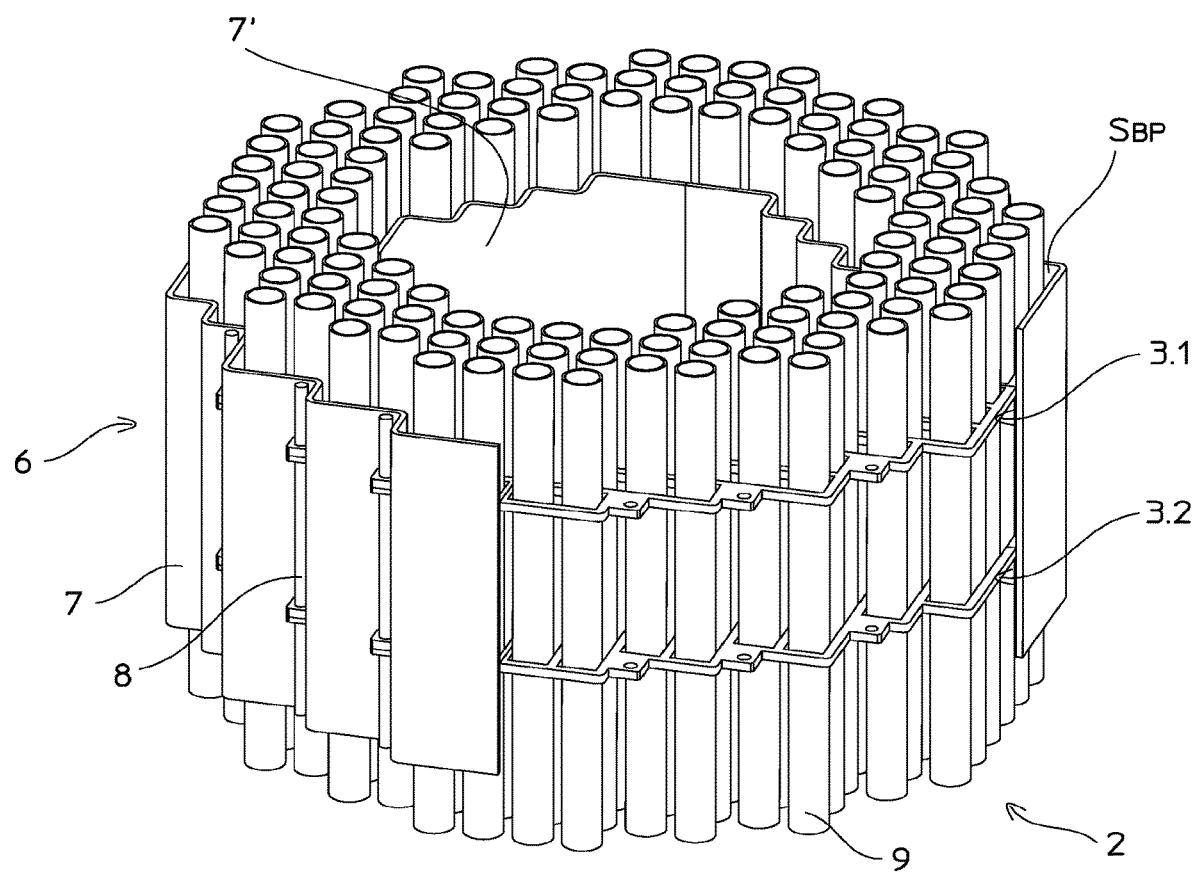
FIG. 2 is a perspective view of a portion of a tube bundle with a shell fixed to baffles of the tube bundle, according to one of various embodiments of the invention.

With reference now to the constructional aspects, FIG. 2 shows one of the possible embodiments in which the shell 6 is formed by a wall 7 with a stepped polygonal shape. Said wall 7 is removably fixed to the frames 10 of the baffles 3 by means of pins 8. The reference number 9 denotes the tubes which form the bundle 2.

The apparatus comprises a plurality of baffles 3 which are spaced by a pitch p in a similar manner to that shown in FIG. 1. The baffles are collectively denoted by the reference number 3. FIG. 2 shows two baffles 3.1 and 3.2 with a different arrangement of the openings for the tubes, in particular oriented at 90 degrees.

Figure 3:
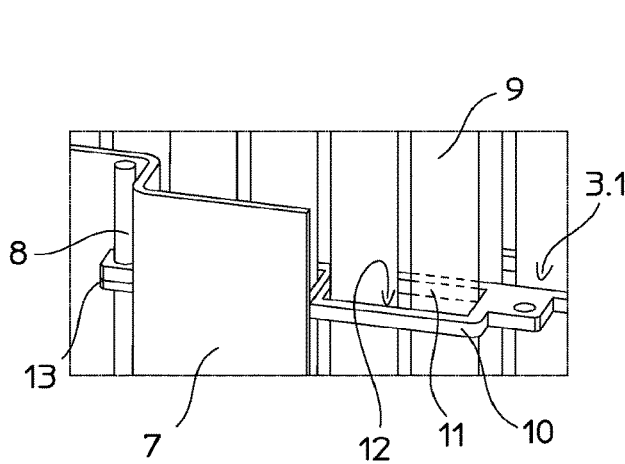
FIGS. 3 and 4 are details of FIG. 2.
Figure 4:
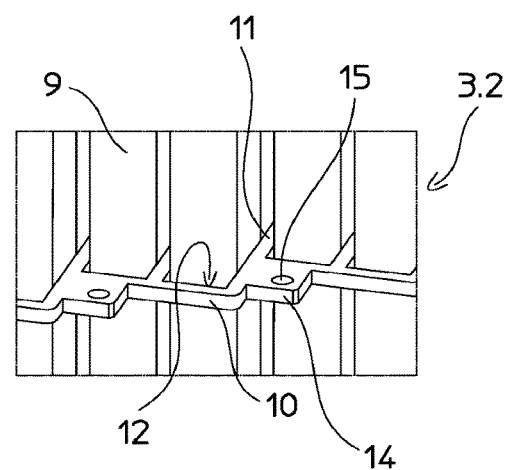

The form of the baffles 3 and the structural connection to the wall 7 (forming the shell 6) are more clearly visible in FIGS. 3 and 4.

A baffle 3 comprises essentially a peripheral frame or edge ring 10 and straight and parallel elements in the form of bars 11 which define openings 12 for the tubes 9. Each opening 12 receives a certain number of tubes. The openings 12 in adjacent baffles may be differently oriented in a plane perpendicular to the axis of the tubes, for example they are oriented at 90 degrees, so as to support the tubes in complementary support planes, as can be understood by comparing the details shown in FIGS. 3 and 4.

It should be noted that the rods 11 represent one of the constructional forms of the baffles 3 and that there are equivalent embodiments with baffles of a different type such as grid baffles, which are known per se and therefore not described in detail here.

In the example shown the frame 10 has a stepped polygonal form, substantially like that of the wall 7; in other embodiments the frame 10 has different forms, for example it is a regular or irregular polygon or a circumference.

The wall 7 of the shell 6 may be formed by different longitudinal sections and/or by different portions which together surround the tube bundle 2.

The pins 8 engage eyelets 13 of the wall 7 and holes 15 of corresponding lugs 14 of the frames 10 of the baffles 3, ensuring positioning and axial support of the said baffles 3. One of the holes 15 is visible in FIG. 4.

It can be understood that, by means of the releasable connection with the pins 8, the shell 6 is structurally cooperating with the baffles 3. The shell directly supports the baffles 3 and no specific framework or structure is necessary, as is instead required in the prior art. The same baffles 3 act as transverse ribs for the shell 6, cooperating to the strength of the shell which can be made particularly light and thin.

Owing to the stepped polygonal form, the potential bypass space of the tubes, denoted by the symbol $S_{BP}$ in FIG. 2, is very small. This is because the stepped wall 7 remains very close to the peripheral tubes 9 of the bundle 2 and matches their arrangement much better than a circular cross-section. Moreover, as can be noted in FIGS. 3 and 4, the small thickness of the frame 10 (owing to the structural collaboration) helps to reduce said bypass space $S_{BP}$.

The amount of play typically present between the outer periphery of the baffles and the inner wall of the shell is also removed, resulting in an increased heat exchange efficiency. A sealing gasket may be provided between the baffles 3 and the wall 7, although it is not essential and normally not present.

FIG. 2 shows an embodiment in which the tube bundle 2 has an annular configuration and the heat exchange unit also comprises an inner wall 7' with the function of an inner tube, for example for conveying the flow upwards after a passage through the shell side. Preferably said inner wall 7' has the same configuration as the outer wall 7, for example the stepped configuration shown in FIG. 2 or a polygonal or circular configuration.

Advantageously the shell 6 comprises one or more joints arranged longitudinally, i.e. Parallel to the direction of the tubes 9.

Figure 5:
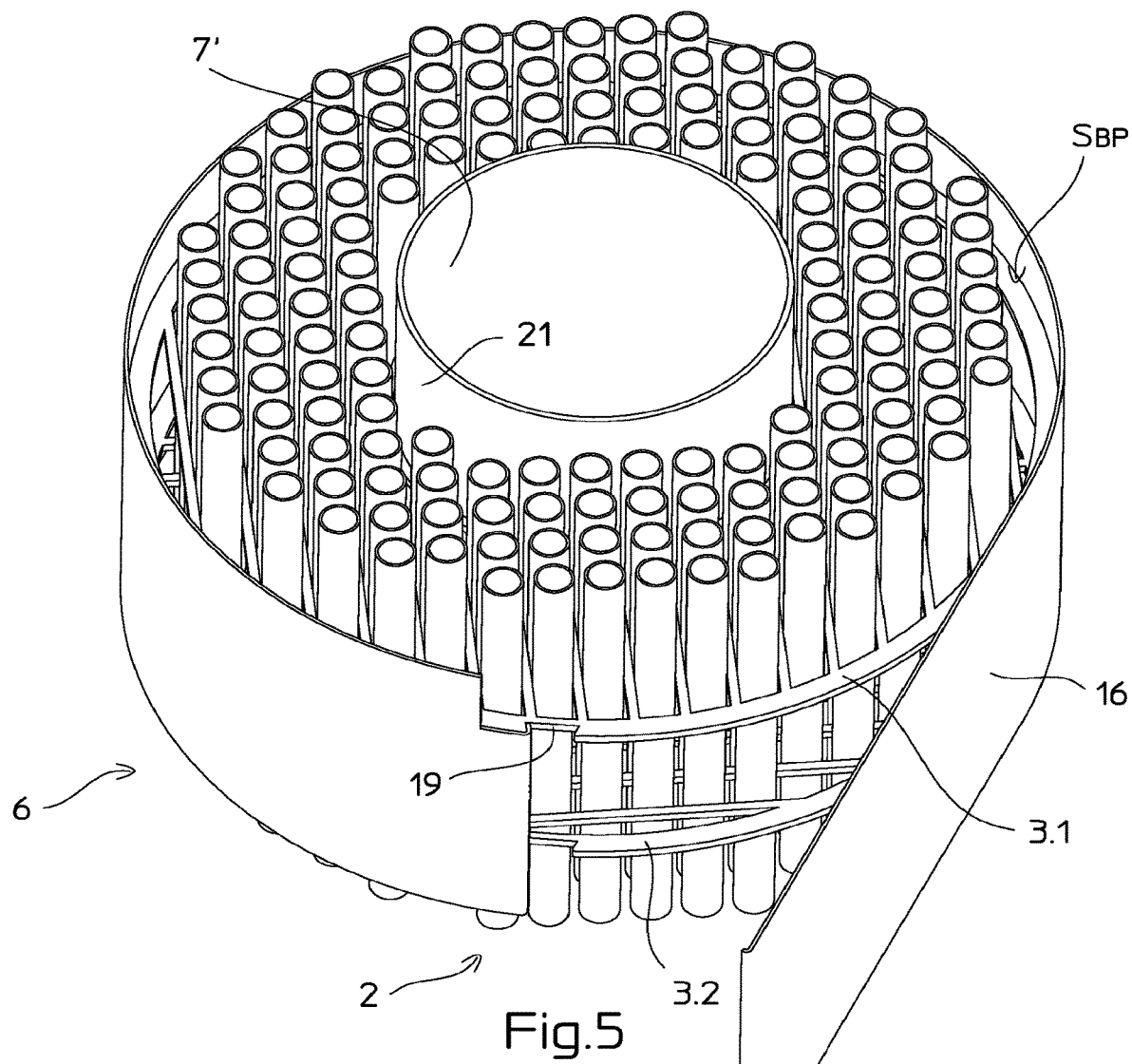
FIG. 5 is a perspective view of a portion of tube bundle with a cylindrical shell, provided with a longitudinal joint and shown open during construction.

FIG. 5 shows an example of a circular shell 6, formed by a metal sheet 16 wrapped around the tube bundle 2, and with a single longitudinal joint 17. Also the FIG. 5 shows two baffles 3, denoted by the symbols 3.1 and 3.2. It should be noted that the metal sheet 16 may be bended and wrapped around the tube bundle, forming a cylinder, as shown in FIG. 5, owing to the small thickness of the metal sheet itself, made possible by the structural collaboration.

Figure 6:
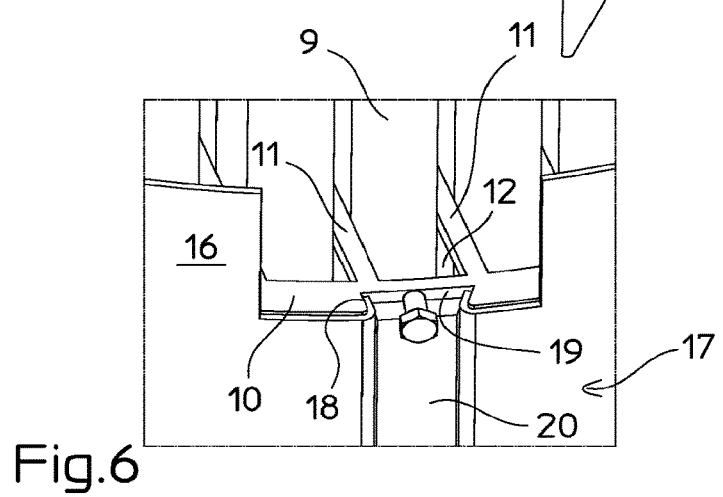
FIG. 6 is a detail of a preferred embodiment for providing a longitudinal joint of the cylindrical shell shown in FIG. 5.

Details of the longitudinal joint 17, according to a preferred embodiment, are shown in FIG. 6. The frame 10 of each baffle 3 has a seat 19, for example in the form of a dovetail, for receiving the ends 18 of the sheet 16. The ends 18 of said sheet 16 are advantageously configured to engage the seats 19, for example they are folded in a hook shape. The sheet 16 is wrapped around the tube bundle 2 as shown for example in FIG. 6 and locked by means of a shaped profile 20.

Figure 7:
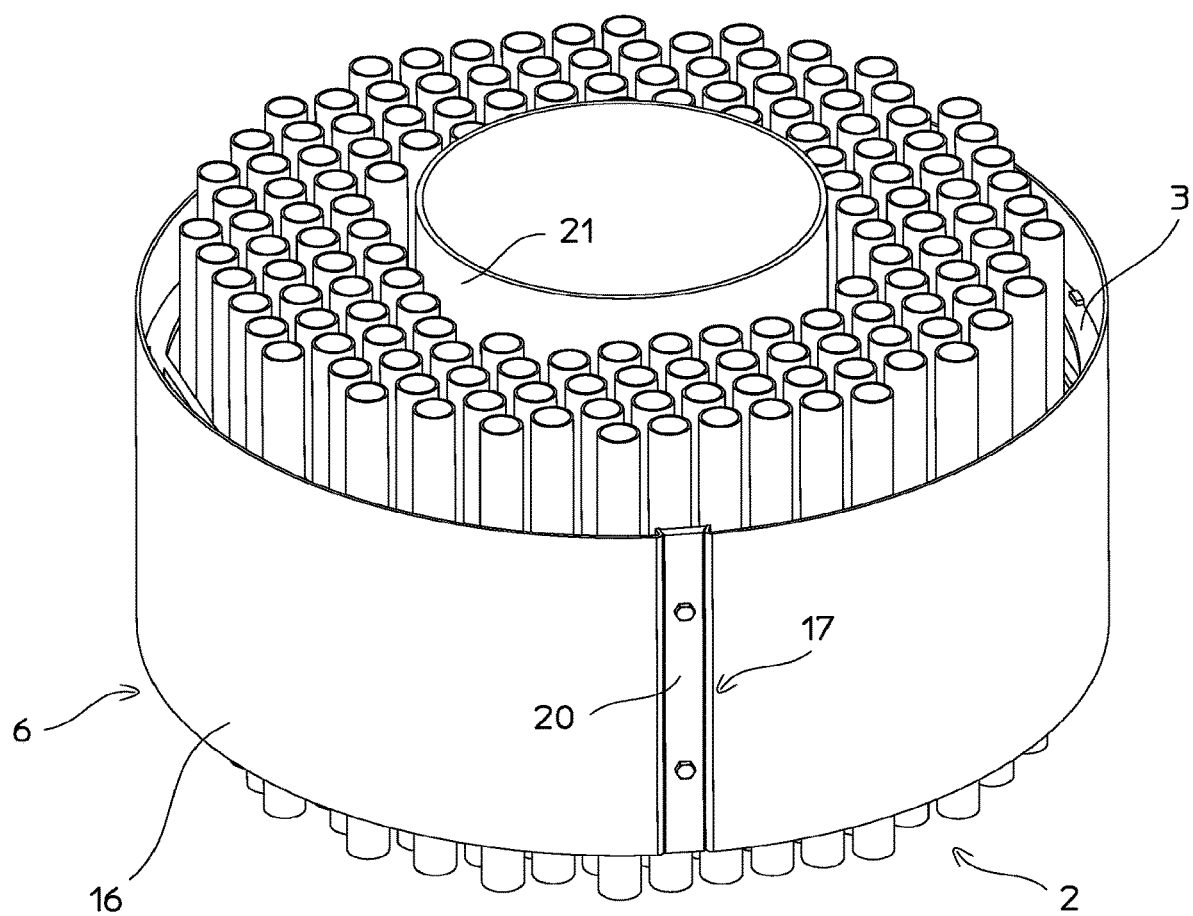
FIG. 7 shows the shell according to FIG. 5 closed by the respective longitudinal joint.

FIG. 7 shows the assembled shell with the longitudinal joint 17. It can be noted that in this example an annular tube bundle 2 with central tube 21 is also shown.

The joint 17 is described solely by way of example; other types of joint are possible, for example joints with eyelets and wedges or joints of the conventional type with overlapping portions. In order to simplify wrapping of the shell 6 around the tube bundle 2, the shell 6 may be advantageously formed by a plurality of sections as in the embodiment of FIG. 9.

Figure 8:
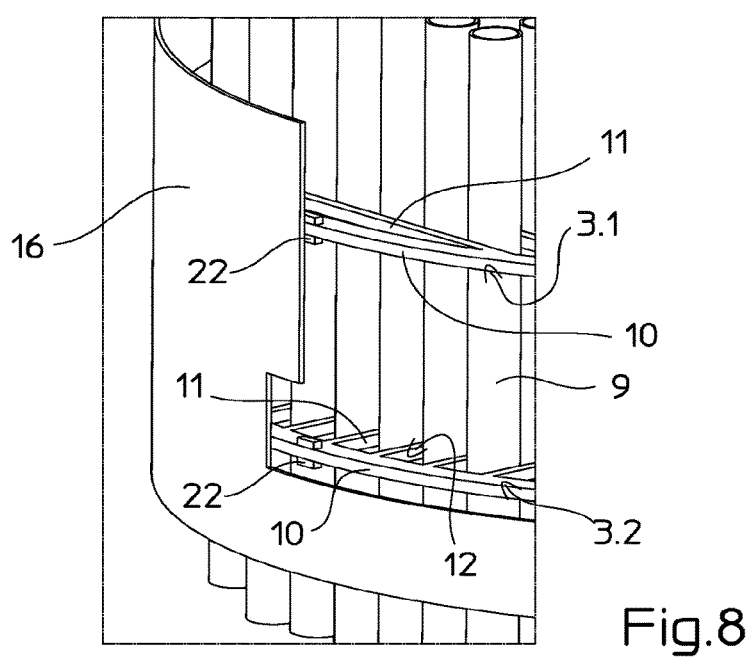
FIG. 8 shows a detail of a preferred way of supporting the baffles by the shell.

The detail in FIG. 8 shows an example of supporting means associated with the shell and suitable for supporting the baffles 3 in the desired positions. In the embodiment shown, by way of example, said support means are formed with pairs of cleats 22 which are fixed to the inner wall of the shell 6 (i.e. the sheet 16). The structural cooperation of the shell 6 which itself supports the baffles 3 is therefore readily understood.

It should also be noted that, owing to the construction with the shell 6 fixed to the baffles 3, said baffles 3 expand longitudinally in relation to the tubes 9 following the shell 6. As a consequence, the heating and in particular the temperature transients (e.g. during start-up of a chemical reactor inside which the unit 1 is inserted) do not induce tensions between the shell and baffles.

The longitudinal joints such as the joint 17 described above and any circumferential joints may also be non-releasable, for example they may be welded and/or riveted. Non-releasable joints may be preferred when the shell removal feature is not necessary or is not required. Also in this case, the welded portions will be configured in order to ensure easy removal of the welding without causing any damage to the parts, so as these parts may be utilized again. Also regarding this aspect, easily demountable portions are contemplated. The structural unity between the shell 6 and the baffles 3 is in any case ensured.

Figure 9:
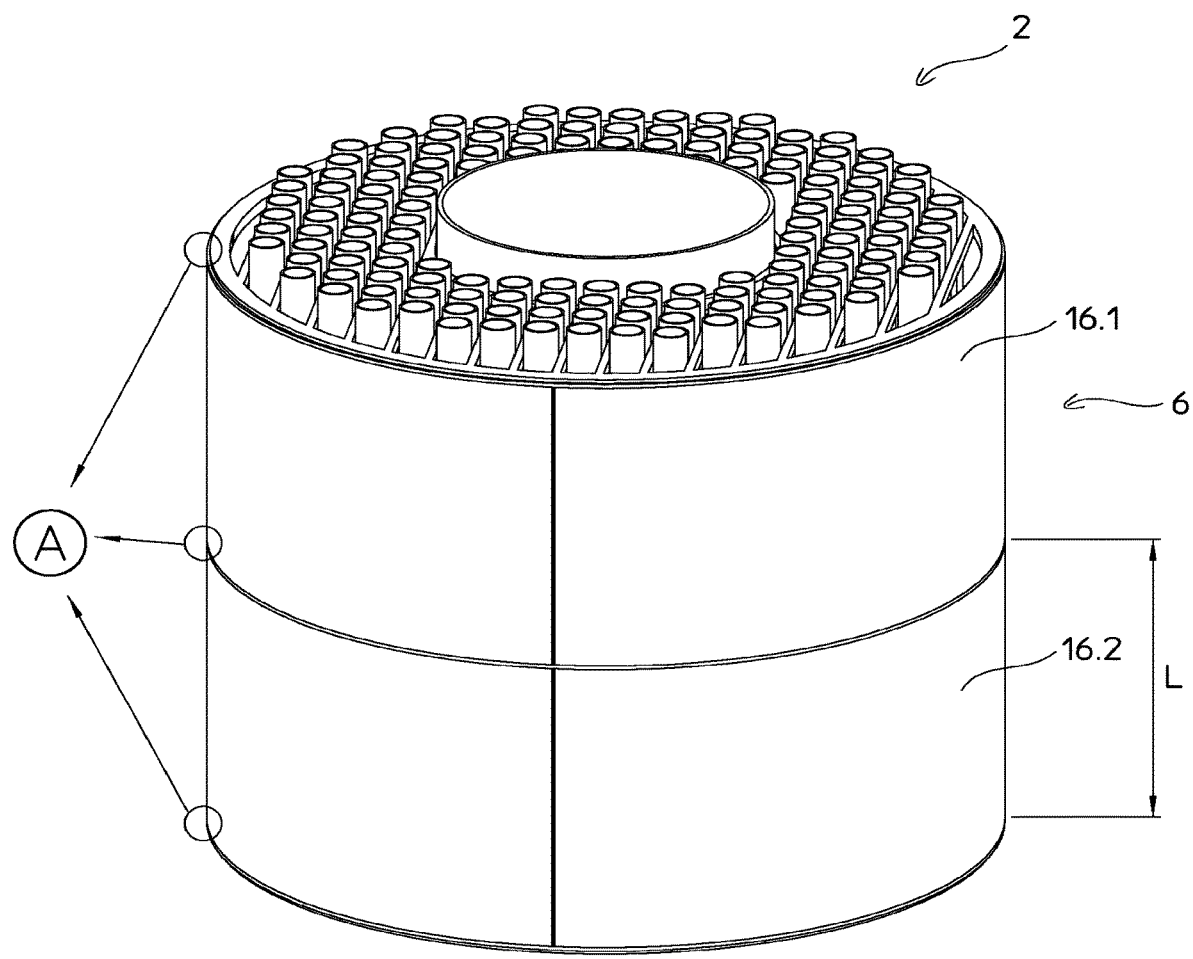
FIG. 9 shows an embodiment with a cylindrical shell formed by longitudinal sections.

FIG. 9 shows an embodiment in which the shell 6 comprises longitudinal sections. The example shows a construction similar to that of FIG. 7, i.e. with a cylindrical shell, where two sections 16.1 and 16.2 are visible. Preferably the length L of a section is equivalent to the pitch p of the baffles 3, shown in FIG. 1, or to a multiple pitch.

Figure 10:
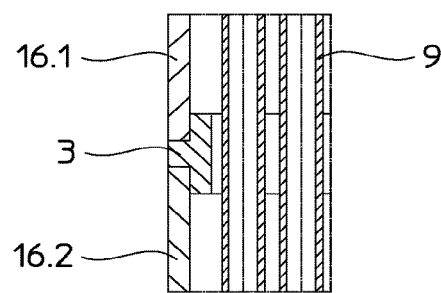
FIG. 10 shows the detail "A" of FIG. 9.

The example in FIG. 9 also shows a welded structure, as can be understood from the detail shown in FIG. 10. The baffles 16.1, 16.2, etc., which form the shell 6 are welded to the baffles 3. In FIG. 3 it is possible to see the edge of the baffle 3 shaped to receive the ends of the sheets 16.1, 16.2.

Figure 11:
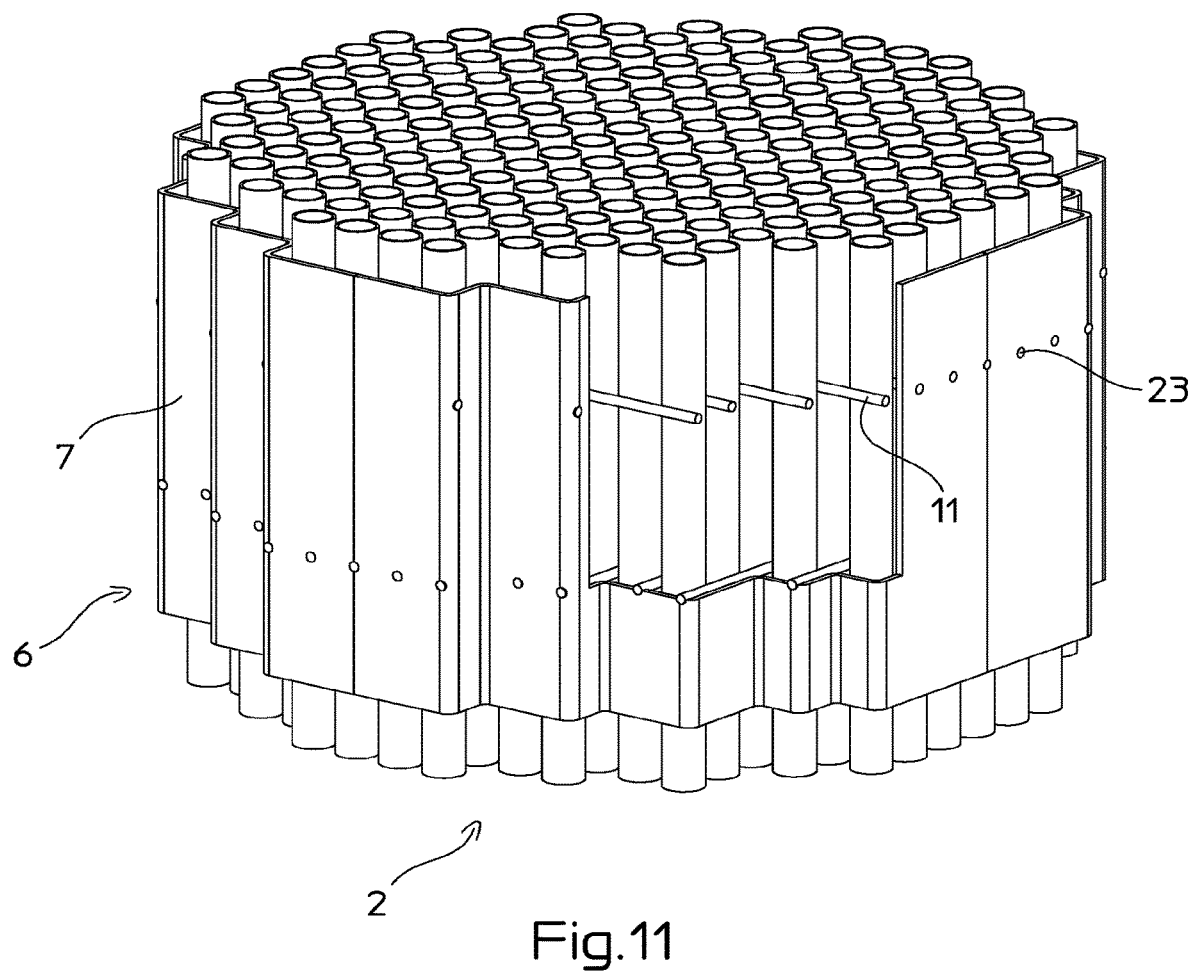
FIG. 11 shows an example of embodiment comprising baffles without a frame and rods fixed directly to the shell.

FIG. 11 shows a variant, where the elements 11 which define the openings 12 for the tubes are directly fixed to the shell 6, i.e. the baffles 3 do not have the frame 10.

The figure shows an example in which substantially circular rods 11 are welded inside holes 23 in the wall 7. In variants with the sleeve formed by several sections, said holes 23 are advantageously formed by half-cavities formed in the edges of the sections. It should be noted that other forms of the rods 11 and the respective seats in the shell (equivalent to the holes 23) are possible.

It should also be noted that FIG. 11 shows a shell 6 formed by a stepped wall 7, as in FIG. 2, but it must be considered that said variant comprising frameless baffles is applicable also to all the other embodiments, such as those comprising a circular shell as shown in FIGS. 5-9.

A central duct, if present (as for example shown in FIG. 7 or FIG. 9), shall be provided with suitable blind seats for said elements.

Figure 12:
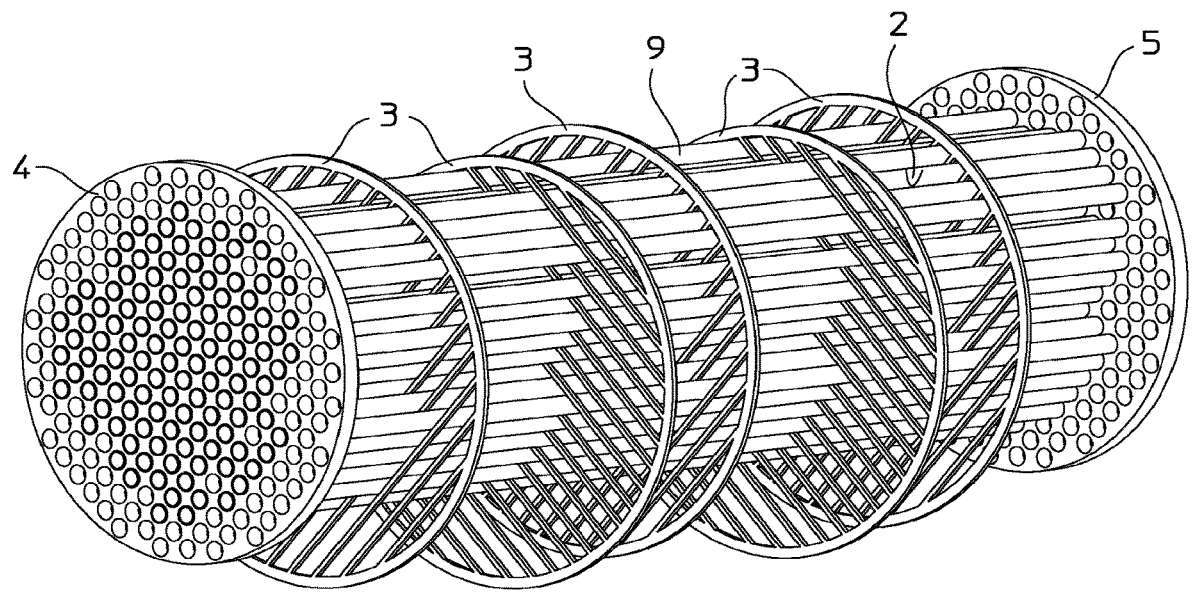
FIG. 12 illustrates an example of a step for assembly of a tube heat exchange unit according to an embodiment of the invention.

FIG. 12 illustrates an example of the manufacturing method which also forms an aspect of the invention. The figure shows the main components, i.e. the bundle 2 of tubes 9, the plates 4 and 5, and the baffles 5. The baffles 3 are movable axially, i.e. in a direction parallel to the tubes 9, and in case also transversely, i.e. in the direction of the openings 12. The figure shows the baffles 3 staggered as a result of this transverse mobility. The transverse mobility is possible in certain cases, for example with baffles which define slotted openings, as long as the peripheral tubes are not mounted; once all the tubes are mounted or in the case of other types of baffle, for example grid baffles, said transverse mobility may be prevented.

It can be understood from FIG. 12 that introduction of tubes 9 into the openings 12 of the baffles 3 during assembly is greatly facilitated. In the prior art, in fact, the tubes are inserted when the baffles 3 are already locked in their definitive position, which means that a tube must engage exactly with the series of openings 12 which have minimum play. This gives rise to major assembly problems. With the invention, on the other hand, the mobility of the baffles 3 makes insertion of the tubes easier and quicker. The baffles 3 are then positioned as desired, spaced at a pitch p, and locked by means of a template or other auxiliary means; the shell 6 is then mounted for example using the procedure illustrated in FIGS. 5-9. The shell 6, once mounted, keeps the baffles 3 in position for example by means of the cleats 22 described above. This example illustrates even more clearly the structural cooperation between the shell and the baffles.

Figure 13:
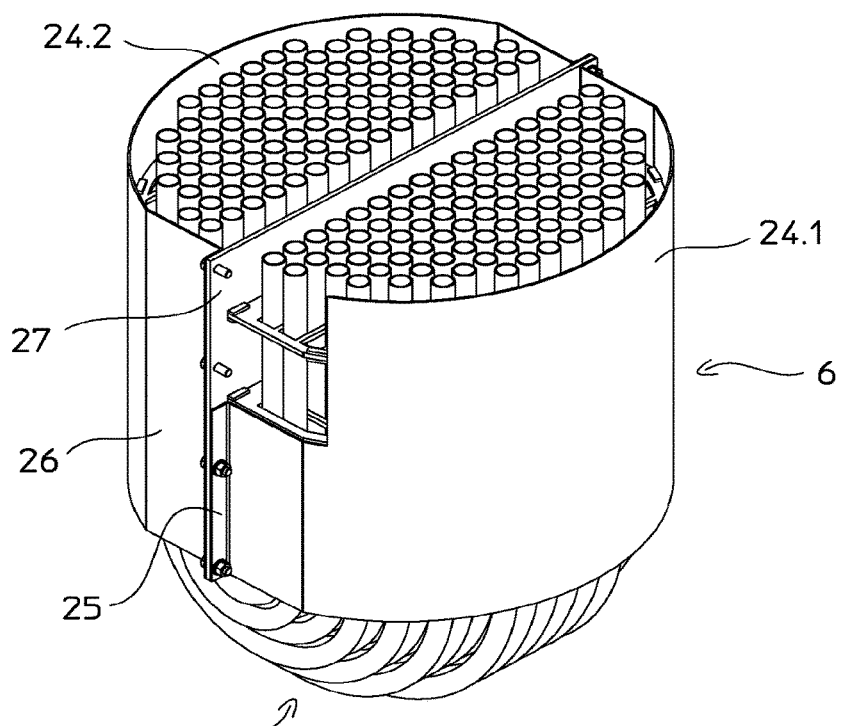
FIG. 13 shows an embodiment with U-shaped tubes.

FIG. 13 shows another constructional variant suitable in particular for a U-shaped tube bundle 2. In this variant the shell 6 (which may be divided into longitudinal sections) is formed by half-shells 24.1 and 24.2 joined together by longitudinal flanges 25. Said half-shells are advantageously shaped with an arc-shaped portion and a flat portion 26 terminating in the flanges 25 and support a longitudinal partition 27 which is clamped between said flanges 25.

It is known that U-tube exchangers normally require a longitudinal partition in order to obtain a shell side passage in counter-flow relative to the tubes; FIG. 13 shows that a longitudinal partition 27 may be supported directly by the shell 6, which in turn is fixed to the baffles 3.

Partitioning of the shell side in U-tube exchangers in other words is particularly simple and advantageous because it ensures absolute sealing of the central partition 27, increasing efficiency and reducing costs. As can be seen from the figure, the shape of the two half-shells 24.1 and 24.2 terminating with flat portions 26 is such that the longitudinal flanges 25 remain within the external dimensions of a conventional cylindrical shell. Several longitudinal divisions of the shell side are possible; for example a shell with three longitudinal passages is obtained with two partitions (which may be constructionally similar to the partition 27 shown in the figure).

FIGS. 14-17 show some of the numerous configurations which are possible thanks to the invention.

Figure 14:
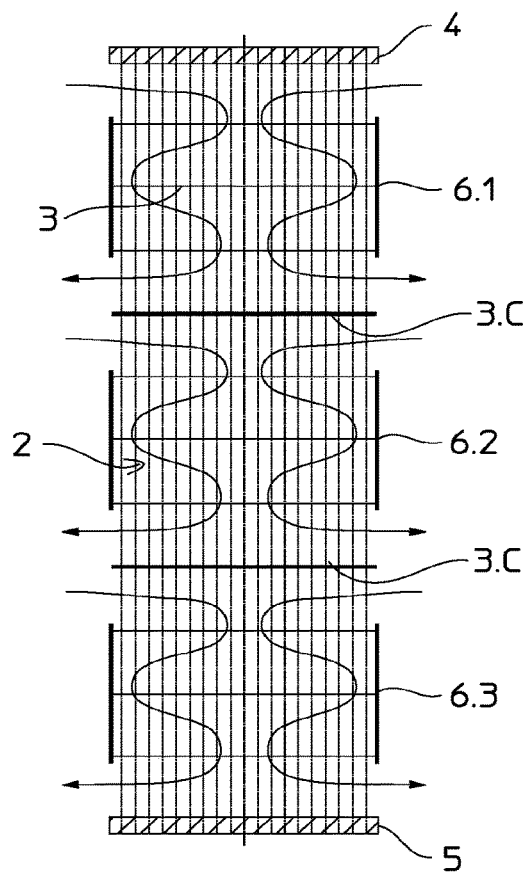
FIGS. 14, 15, 16 and 17 are diagrams similar to that of FIG. 1, showing a number of other embodiments of the invention.

FIG. 14 shows an exchanger with straight tubes, in which the shell 6 is formed substantially by three longitudinal sections 6.1, 6.2 and 6.3. The ends of the sections are spaced so as to leave openings for gas inlet and outlet. Furthermore the exchanger comprises blind baffles 3.c between a longitudinal section and the following section. Said baffles 3.c, unlike the baffles 3 (indicated by a thin line) do not allow the gas passage in the shell side. Three shell side passages are then obtained, as shown by the arrows in the figure.

Figure 15:
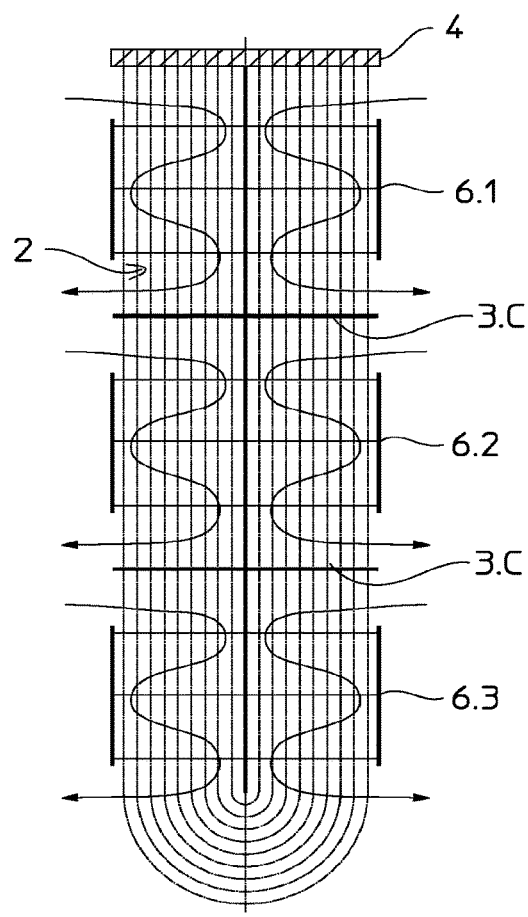

FIG. 15 shows a diagram with U-shaped tubes instead of straight tubes and, therefore, with a single tube plate 4. A longitudinal partition is also present and the shell side is divided into six sections.

The fluid which flows in the shell side may undergo a given process step between one passage and another. Said process step may include for example a heat exchange and/or a chemical reaction stage. The exchanger shown in FIG. 14 or FIG. 15, in other words, may perform essentially the same function as three different exchangers, while being constructionally simpler and less costly than three separate exchangers, since it has only one or two tube plates, depending on whether the tubes are U-shaped or straight.

For example, the exchanger shown in FIG. 14 may be inserted in a reactor for ammonia synthesis, and the three passages on the shell side perform intermediate cooling between catalytic beds.

Figure 16:
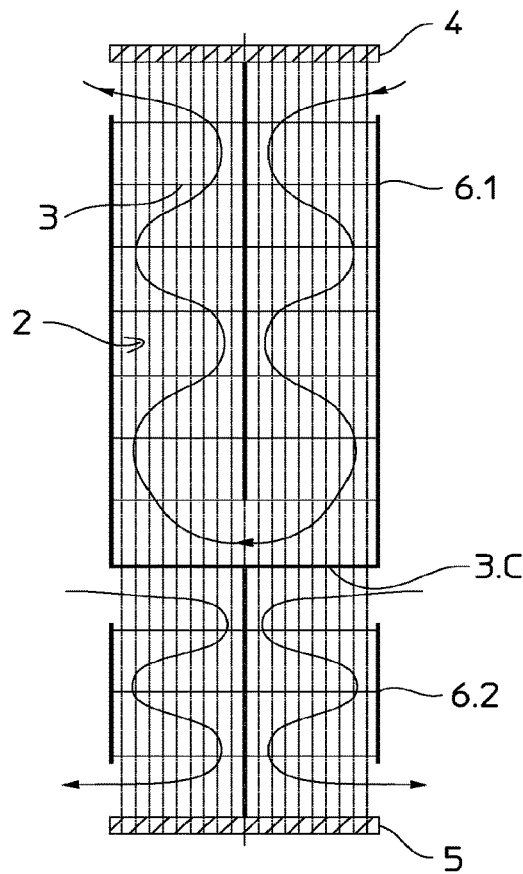
Figure 17:
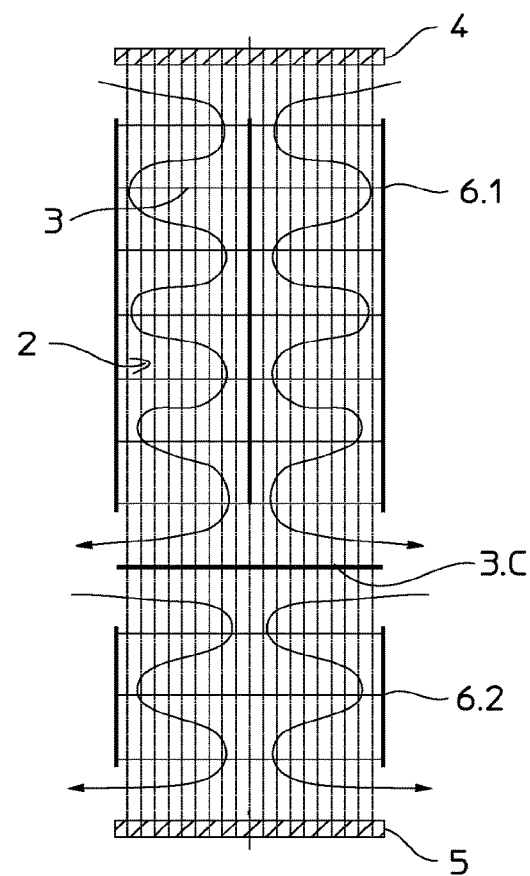

FIGS. 16 and 17 show two configurations in which the shell side is divided into two passages. In FIG. 16 there is a seal between the blind baffle 3.c and the shell section 6.1, with the first passage outlet alongside the inlet. Said configuration is advantageous in certain applications, for example vertical exchangers inside reactors, where it is desirable that both the inlet and outlet of the shell side gas are located at the top.

The invention may be applied to new reactors, in the form of new equipment, or may be used to modernize existing reactors.

Figure 18:
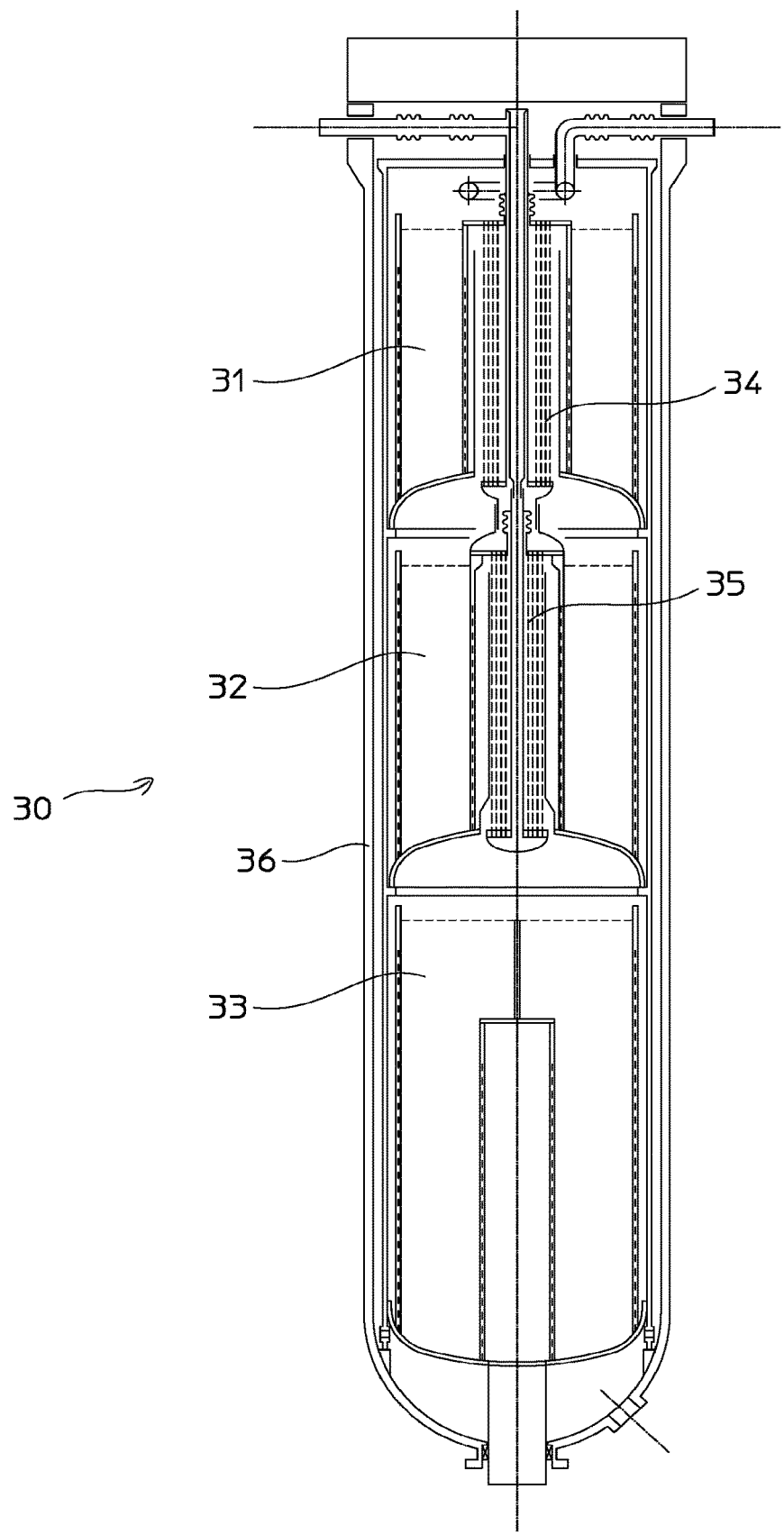
FIG. 18 shows a multi-bed catalytic reactor of the conventional type.

One of the applications of the invention relates to modernization of the reactors of the type shown in FIG. 18. By replacing one or more pre-existing tube exchangers with tube exchangers according to the invention, advantages may be obtained, including: greater efficiency, recovery of useful volume for the catalyst, possibility of reducing the internal piping.

Said FIG. 18 shows schematically a multi-bed reactor 30 for the high-pressure synthesis of ammonia or methanol, comprising catalytic beds 31, 32, 33 and two intermediate cooling exchangers 34, 35. The reactor 30 is equipped with an outer shell 36 able to withstand the operating pressure. The operating principle of the reactor 30 is known from the art and does not require a detailed description. A flow of reagent gases passes radially through the first bed 31, increasing in temperature owing to the exothermic reaction; the hot flow leaving the bed 31 is cooled when passing through the shell side of the exchanger 34 and passes into the bed 32 for an ensuing reaction stage; upon leaving the bed 32, the gas cools when passing into the shell side of the exchanger 32 and enters into the bed 33 for the final conversion stage.

Figure 19:
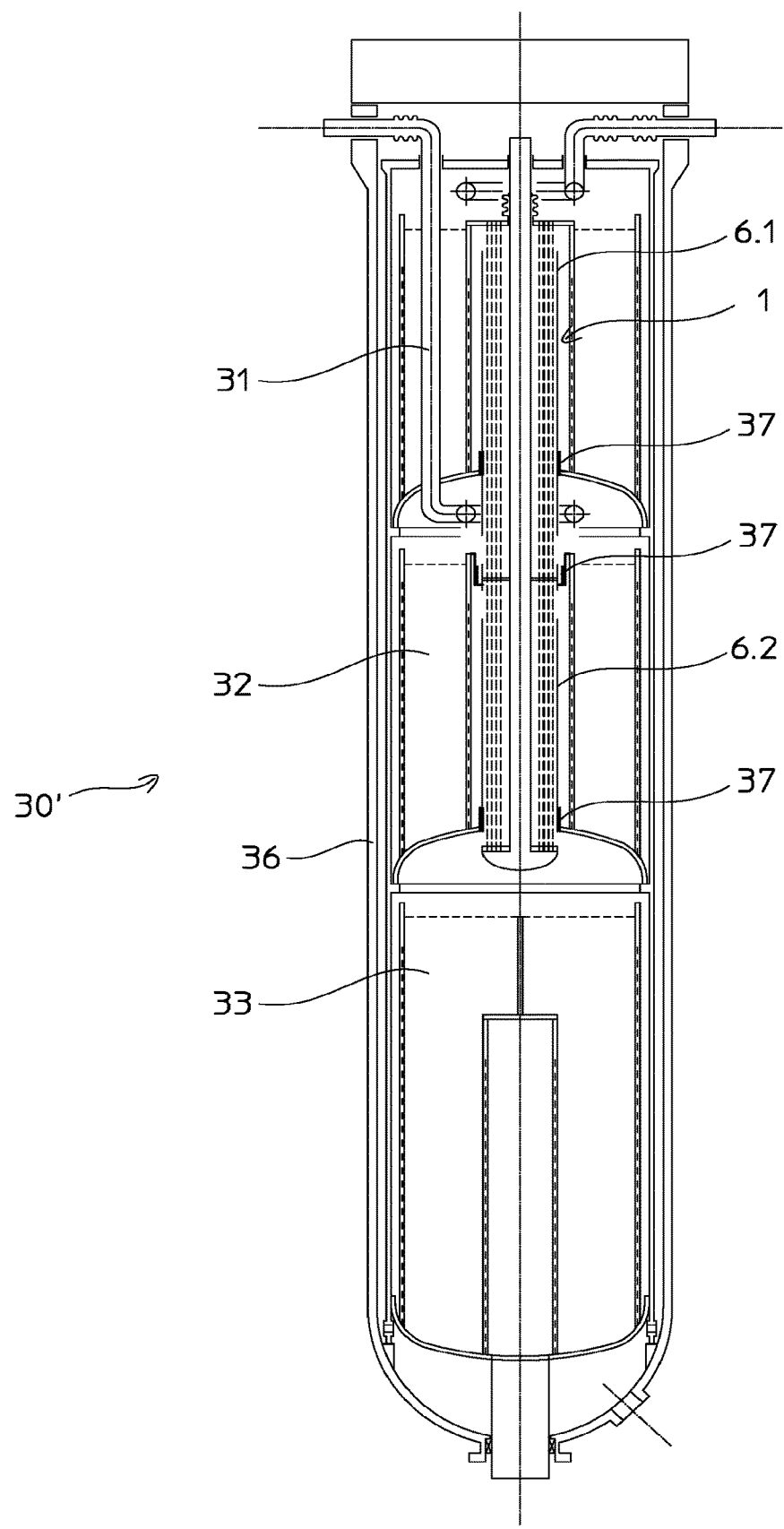
FIG. 19 shows a multi-bed catalytic reactor comprising a heat exchange unit according to the invention.

FIG. 19 shows the modified reactor, indicated by the reference number 30'. The heat exchange between the catalytic beds is performed by a unit 1 according to the invention with segmental shell formed by two sections 6.1 and 6.2 which replaces the two exchangers 34, 35. The path of the shell side gas is regulated by means of suitable seals 37.

One of the advantages of the invention consists in the fact that, owing to the segmented structure of the shell, a single tube bundle is sufficient and therefore only two tube plates are needed. The conventional structure according to FIG. 18 instead requires two tube bundles, each having two respective plates.

It should be noted that the elevated reaction pressure can be withstood by the shell 36. The shell 6.1, 6.2 of the internal unit 1 is subject to a pressure difference substantially due to pressure losses and therefore limited to a few bars.

Referring to FIG. 19, it can be seen that the pressure inside the shell of unit 1 is lower than the pressure outside said shell. The stress which the shell is subjected to is substantially equal to that of a cylinder being subjected to a pressure from the outside. Owing to the structural collaboration, the stress is partially withstood by the baffles and the tube bundle, and the shell is constructed with a small thickness.

What is claimed is:

1. A tube-bundle heat exchange unit for internals of heat exchangers or reactors, comprising:
    a tube bundle, which in turn comprises a plurality of tubes and a plurality of baffles supporting the tubes; and
    a shell which surrounds said tube bundle, wherein said baffles are perpendicular to a longitudinal axis of the tube bundle and define through-openings for the tubes, according to a predefined scheme;
    wherein the assembly formed by the tube bundle and the shell is demountable;
    the heat exchange unit being characterized in that:
    said shell is structurally cooperating with the tube bundle through said baffles, so as a stress acting on the shell is partially withstood by the tube bundle itself.

2. The heat exchange unit according to claim 1, wherein the baffles of the tube bundle comprise respective peripheral edge rings, and the structural cooperation between the shell and the tube bundle is given by the shell resting on said rings.

3. The heat exchange unit according to claim 2, wherein the shell rests on said rings of the baffles of the tube bundle along at least 50% of their perimeter and preferably along the entire perimeter.

4. The heat exchange unit according to claim 1, wherein the baffles comprise bars substantially acting as struts of said shell.

5. The heat exchange unit according to claim 1, wherein the shell is not self-supporting, the shell thickness being smaller than a minimum thickness required by the stress acting on the shell in operation, and the shell resistance to said stress being given by the structural collaboration with the tube bundle.

6. The heat exchange unit according to claim 1, wherein the shell is formed by one or more sectors wrapped around the bundle, the rims of said one or more sectors being connected along one or more longitudinal joints.

7. The heat exchange unit according to claim 6, wherein the sector or the sectors of the shell are represented by substantially plane metal sheets which are bended for surrounding the tube bundle.

8. The heat exchange unit according to claim 1, wherein said shell comprises a plurality of longitudinal sections.

9. The heat exchange unit according to claim 8, wherein the shell comprises at least two longitudinal sections, the heat exchange unit comprises at least one blind baffle between two consecutive sections of said shell, said blind baffle forming a gas-tight barrier in the shell side of said apparatus, the shell side of the apparatus thus being divided into at least two separate gas passages.

10. The heat exchange unit according to claim 8, wherein said longitudinal sections have a length, in the longitudinal direction, substantially equivalent to the distance or pitch between said baffles of the tube bundle.

11. The heat exchange unit according to claim 1, wherein the shell has a cross-section chosen among:
   a cross-section with the form of a regular or irregular polygon;
   a stepped cross-section; and
   a cross-section comprising at least one straight side and at least one curvilinear side.

12. The heat exchange unit according to claim 1, wherein said shell comprises means for constraining the baffles, acting in the axial direction parallel to said tube bundle, said baffles being therefore axially retained in a predefined position by said shell.

13. The heat exchange unit according to claim 1, characterized by a substantially fluid-tight joint between said baffles and said shell.

14. The unit according to claim 1, comprising at least one impermeable sealed partition which is longitudinal and parallel with respect to the tube bundle.

15. A pressurized apparatus, comprising an outer shell resistant to a predefined operating pressure, and at least one internal tube heat exchange unit, according to claim 1.

16. The pressurized apparatus according to claim 15, wherein said apparatus is a chemical reactor of the multi-bed type comprising a plurality of adiabatic catalytic beds, and the at least one tubular heat exchange unit inside the reactor is a heat exchanger for intercooling between two catalytic beds.

17. A method for assembling a tube heat exchange unit for internals of heat exchangers or reactors according to claim 1, comprising: providing a tube bundle having a plurality of baffles, the baffles being freely movable at least in the axial direction with respect to said tube bundle, providing a shell around the tube bundle, and wherein said shell, once positioned around the tube bundle, axially retains the baffles with respect to the tube bundle in respective operating positions, and the shell structurally cooperates with the tube bundle through said baffles, so as a stress acting on the shell is partially withstood by the tube bundle itself.

18. The method according to claim 17, wherein the shell is formed by one or more portions which are bended and wrapped around the tube bundle during the assembling.

19. The heat exchange unit according to claim 1, wherein the shell has a cross-section chosen among:
   a cross-section with the form of a regular polygon;
   a stepped cross-section; and
   a cross-section comprising at least one straight side and at least one circle arc.

* * * * *